UNITED STATES PATENT OFFICE.

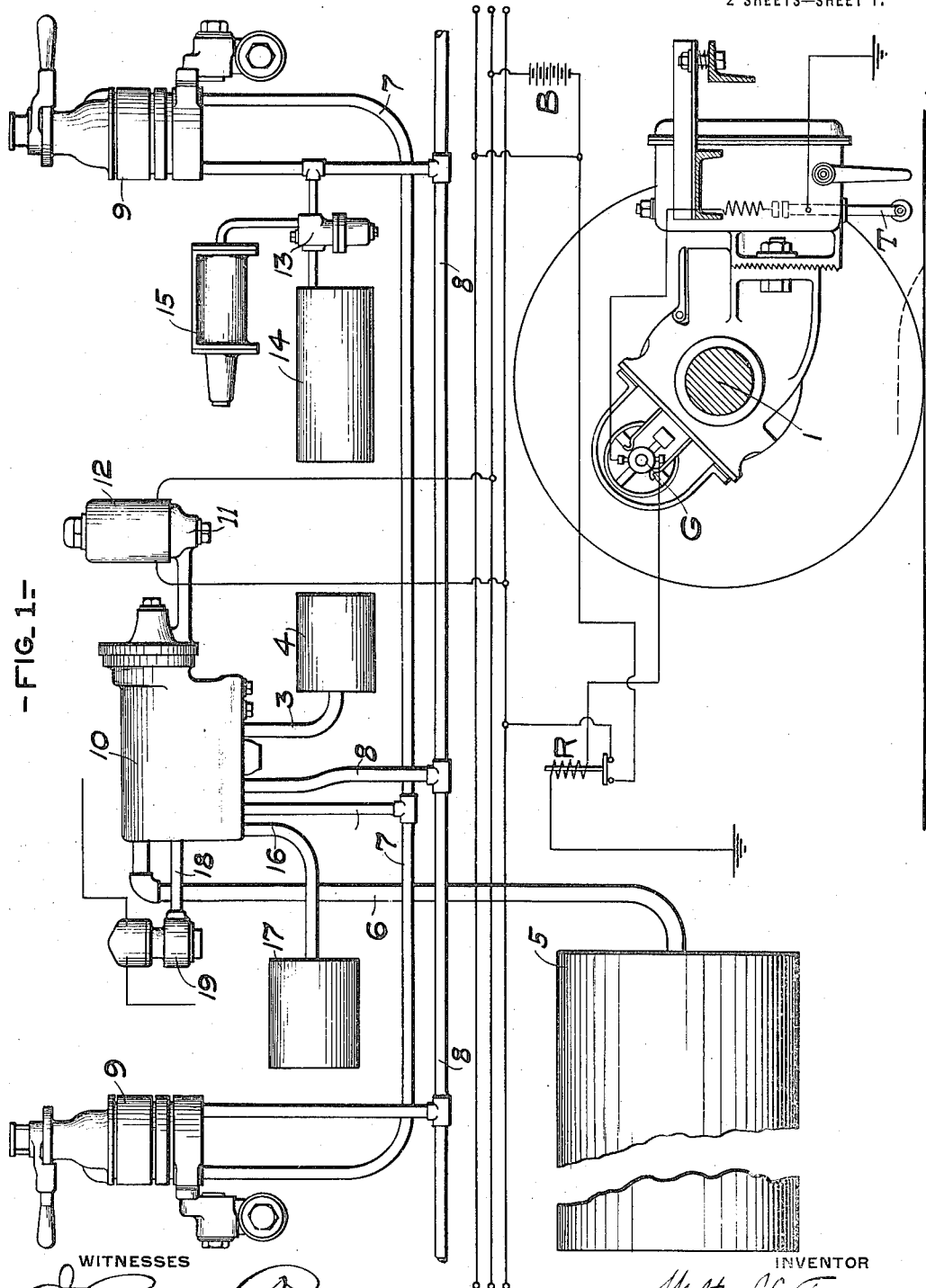

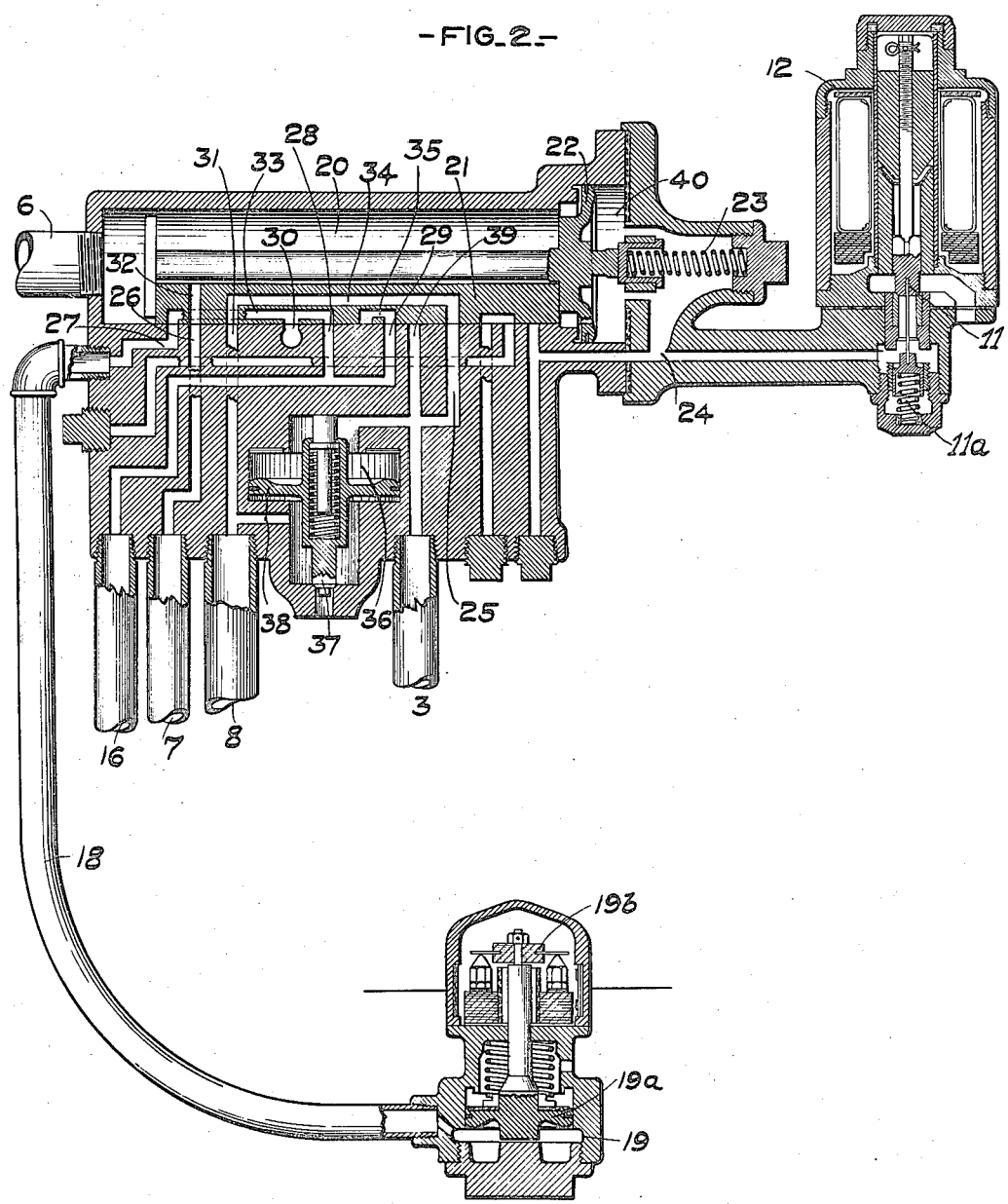

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SPEED-CONTROLLED BRAKE.

1,255,956.  Specification of Letters Patent.  Patented Feb. 12, 1918.

Application filed March 30, 1915. Serial No. 18,028.

*To all whom it may concern:*

Be it known that I, WALTER V. TURNER, a citizen of the United States, residing at the borough of Edgewood, in the county of Allegheny and State of Pennsylvania, have invented a certain new and useful Improvement in Speed-Controlled Brakes, of which improvement the following is a specification.

This invention relates to fluid pressure brakes, and more particularly to that type of brake apparatus governed by the speed of the vehicle, the object being to provide an improved valve device including a train pipe discharge valve and equalizing piston for producing a service reduction in train pipe pressure, and the whole device being governed by a speed controlled means to effect a service application of the brakes when the speed exceeds a certain limit, and to again release the brakes when the speed has been reduced to a predetermined rate.

In the accompanying drawing: Figure 1 is a diagram illustrating a brake apparatus and speed controlled means embodying my improvement; and Fig. 2, a section of my improved fluid pressure valve device.

As shown in Fig. 1, the vehicle may be equipped with the usual standard fluid pressure brake apparatus, comprising a main reservoir, 5, train pipe, 8, triple valve, 13, auxiliary reservoir, 14, brake cylinder, 15, and brake valves, 9, at either end of the car. My improved valve device, 10, is introduced into the pipe connections between the main reservoir and the brake valves, being connected by a pipe, 6, to the main reservoir, and by pipe, 7, to the brake valves.

The valve device, 10, which is shown more in detail in Fig. 2, comprises a valve chamber, 20, communicating directly with the main reservoir through pipe, 6, and containing a slide valve, 21, and operating piston, 22. The fluid pressure from the main reservoir in the valve chamber, 20, equalizes around the piston, 22, or through a small port therein, into the chamber, 40, on the other side of said piston so that the same is normally balanced as to fluid pressure when chamber, 40, is closed, and the piston and valve are held in the position shown by means of the spring, 23.

In the slide valve, 21, are located ports and passages, 32, 33, 34 and 35, while the seat of the slide valve is provided with the following ports: exhaust port, 30; port, 26, communicating with the pipe, 7; port 31, connected to the train pipe, 8; port, 27, communicating with pipe, 18, leading to a circuit breaker cylinder, 19; ports, 28 and 29, communicating with pipe, 16, leading to a reduction reservoir, 17; ports, 39 and 25, communicating with chamber, 36, and pipe, 3, leading to equalizing reservoir, 4. The chamber, 36, contains the equalizing piston, 38, for operating the train pipe discharge valve, 37, the port, 31, of the train pipe, 8, also being connected to the chamber beneath the equalizing piston, 38. When the valve, 21, is in its normal position, as shown in Fig. 2, air from the main reservoir and pipe, 6, has free access to the pipe, 7, and the brake valves through ports, 32 and 26, and the system is charged in the usual manner. Air from the train pipe, 8, flows through ports, 31, 34, and 25, to the chamber, 36, and equalizing reservoir, 4, charging the same to the desired degree of pressure. The reduction reservoir, 17, is at this time exhausted to the atmosphere through ports, 28, 33 and 30. The cylinder, 19, also communicates with the atmosphere through ports, 26, 33 and 30.

For governing the operation of the piston, 22, and slide valve, 21, I preferably employ a valve, 11, operated by electro-magnet, 12, the circuit to said magnet being controlled by a speed governing mechanism driven from the car axle. Any suitable or preferred form of speed controlled means may be employed, that indicated in Fig. 1, comprising a generator, G, driven by the axle, 1, and connected in a circuit with a relay switch, R, normally closed and controlling a circuit from a battery, B, to the magnet, 12. The valve, 11, which is normally held closed by the energized magnet, 12, controls communication from chamber, 40, through passage, 24, to the atmosphere. When the circuit to the electromagnet is opened by the speed controlled relay switch, R, the magnet is deënergized, and the valve, 11, is promptly opened by the air pressure assisted by a spring, 11ᵃ. Air under pressure from chamber, 40, at the rear of the piston, 22, then flows to the atmosphere and the pressure on this side of the piston is rapidly reduced. The higher main reservoir pressure acting on the other side of the piston, 22, then moves the same, and with it the slide valve, 21, to the application position, in which the supply of air from the main reservoir pipe, 6, through port, 26, to pipe, 7, and the brake valve, is cut off, and the port 27, is opened to allow air under pressure to flow through pipe, 18, to cylinder, 19, where it acts on piston, 19$^a$, to move the switch, 19$^b$, and open the supply circuit to the motors. In this position of the valve, 21, the exhaust port, 30, is closed, and communication from the train pipe, 8, through ports, 31 and 25, to the equalizing reservoir and chamber, 36, is also cut off, while said chamber and equalizing reservoir are placed in communication with the reduction reservoir, 17, through ports, 39, 35 and 29, and pipe, 16. The pressure in chamber, 36, and the equalizing reservoir then falls due to the expansion of air therefrom into the reduction reservoir, and as the train pipe, 8, is still in communication with the space beneath the equalizing piston, 38, this piston is raised to open the train pipe discharge valve, 27, thereby venting air from the train pipe to the atmosphere and producing a service application of the brakes through the operation of the triple valve in the usual manner. When the pressures in the equalizing reservoir and reduction reservoir have equalized, further reduction in chamber, 36, ceases, and as soon as the train pipe pressure below the piston, 38, has fallen to the same degree, the piston descends, closing discharge valve, 37, and preventing further train pipe reduction. The brakes will remain applied until the speed is sufficiently reduced that the relay switch, R, is again closed and the magnet, 12, energized to close the valve, 11. The fluid pressure then equalizes around the piston, 22, into chamber, 40, and the spring, 23, returns the piston and slide valve, 21, to release position in which the cylinder, 19, is connected to the exhaust thereby closing the power circuit, and communication is again established from the main reservoir to the brake valves to restore the train pipe pressure and release the brakes in the usual manner.

Where it is desired that the circuit of the axle driven generator should be made effective for operation at certain sections or zones along the track, and the resistance in said circuit varied for different zones, trip devices, T, may be provided for engaging certain ramps located along the track at the respective zones whereby the generator circuit may be closed with the proper amount of resistance for the desired maximum speed permissible at each particular zone.

Having now described my invention, what I claim as new and desire to secure by Letters Patent is:

1. In a fluid pressure brake apparatus, the combination with a train pipe and an equalizing reservoir, of a train pipe discharge valve, a piston for operating said discharge valve and subject to the opposing pressures of the train pipe and said equalizing reservoir, an automatic valve device for venting air from said equalizing reservoir, and a speed controlled mechanism for governing the operation of said valve device.

2. In a fluid pressure brake apparatus, the combination of a train pipe, an equalizing reservoir, a train pipe discharge valve operated by the opposing pressures of the train pipe and said reservoir, an automatic valve device for controlling communication from the train pipe to said reservoir and the venting of said reservoir, and a speed controlled mechanism for governing the operation of said valve device.

3. In a fluid pressure brake apparatus, the combination of a main reservoir, a train pipe, an equalizing reservoir, a piston subject to the pressures of the equalizing reservoir and the train pipe, a train pipe discharge valve actuated by said piston, an automatic valve device controlling the supply from the main reservoir to the train pipe, from the train pipe to the equalizing reservoir, and a vent from the equalizing reservoir, and a speed controlled mechanism for governing the operation of said valve device.

4. In a fluid pressure brake apparatus, the combination of a train pipe, an equalizing reservoir, a train pipe discharge valve operated by the pressures of said reservoir and the train pipe, a reduction reservoir, an automatic valve device controlling communication from the train pipe to the equalizing reservoir and from the equalizing reservoir to said reduction reservoir, and a speed controlled mechanism for governing the operation of said valve device.

5. In a fluid pressure brake apparatus, the combination of a train pipe, an equalizing reservoir, a piston subject to the pressures of the train pipe and equalizing reservoir, a train pipe discharge valve actuated by said piston, a fluid pressure operated valve device controlling a vent from said equalizing reservoir and communication from the train pipe to said reservoir, a magnet valve for varying the pressure acting on said valve device, and a speed controlled mechanism for opening and closing the circuit to said magnet.

6. In a fluid pressure brake apparatus, the combination of a train pipe, an equalizing reservoir, a piston subject to the pressures of the train pipe and equalizing reservoir, a train pipe discharge valve actuated by said piston, a reduction reservoir, an automatic valve device adapted in one position to open communication from the train pipe to said equalizing reservoir, and from the reduction reservoir to the atmosphere, and in another position to close communication from the train pipe to the equalizing reservoir and to open communication from the equalizing reservoir to said reduction reservoir, and a speed controlled mechanism for governing the operation of said valve device.

WALTER V. TURNER.

Witnesses:
A. M. CLEMENTS,
S. W. KEEFER.